United States Patent [19]

Chambonnet

[11] Patent Number: 5,507,308
[45] Date of Patent: Apr. 16, 1996

[54] GAS PRESSURE REGULATOR

[75] Inventor: Bernard Chambonnet, Vence, France

[73] Assignee: La Spirotechnique Industrielle et Commerciale, Carros Cedex, France

[21] Appl. No.: 374,721

[22] PCT Filed: Jun. 21, 1994

[86] PCT No.: PCT/FR94/00745

§ 371 Date: Jan. 27, 1995

§ 102(e) Date: Jan. 27, 1995

[87] PCT Pub. No.: WO95/00893

PCT Pub. Date: Jan. 5, 1995

[30] Foreign Application Priority Data

Jun. 23, 1993 [FR] France .................................. 93 07614

[51] Int. Cl.⁶ .................................................. B63C 11/22
[52] U.S. Cl. .................................. 137/81.2; 137/505.25; 128/204.29
[58] Field of Search .............................. 137/505.25, 172, 137/81.2; 128/204.26, 204.29

[56] References Cited

U.S. PATENT DOCUMENTS

| | | | |
|---|---|---|---|
| 3,698,425 | 10/1972 | Fisher | 137/505.25 |
| 4,083,380 | 4/1978 | Huber | 137/505.25 |
| 4,226,257 | 10/1980 | Trinkwalder | 137/81.2 |
| 4,230,140 | 10/1980 | Hart | 137/81.2 |
| 4,396,032 | 8/1983 | Duchesne et al. | 137/81.2 |
| 4,484,695 | 11/1984 | Fallon et al. | 137/505.25 |
| 5,097,860 | 3/1992 | Ferguson et al. | |
| 5,184,609 | 2/1993 | Hart | 137/172 |

FOREIGN PATENT DOCUMENTS

| | | | |
|---|---|---|---|
| 219629 | 12/1957 | Australia | 137/505.25 |
| 0531195 | 3/1993 | European Pat. Off. | |
| 2426289 | 12/1979 | France | |
| 2040171 | 8/1980 | United Kingdom | |

Primary Examiner—A. Michael Chambers
Attorney, Agent, or Firm—Young & Thompson

[57] ABSTRACT

The regulator comprises a piston (13) comprising a hollow rod (21) extending through an internal partition (6) delimiting a high pressure chamber (3) and an internal chamber (5) and coacting with a valve seat (24) disposed in the high pressure chamber (3) and carried by a closure member (25) mounted in one end (2) of the regulator body. The internal chamber (29) communicates with a lateral chamber (9) formed externally by a membrane (10), the two chambers (9 and 5) being filled with an incompressible fluid (29), typically a silicone oil, transmitting to the piston (13) the ambient pressure. The regulator is useful in respiratory equipment for divers, particularly for divers in cold water.

9 Claims, 1 Drawing Sheet

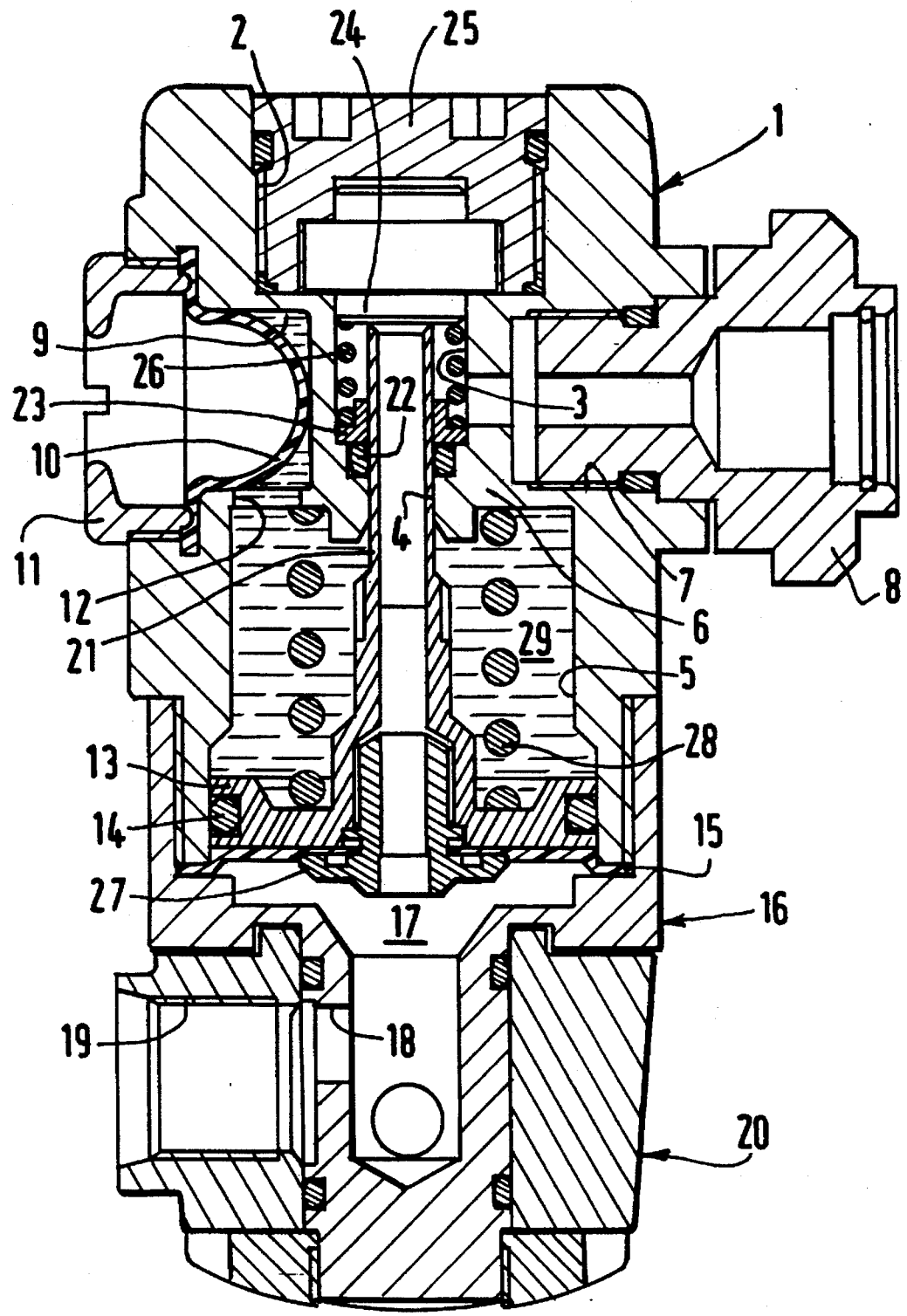

5,507,308

GAS PRESSURE REGULATOR

FIELD OF THE INVENTION

The present invention relates to gas pressure regulators, particularly breathable gas for divers, of the type comprising, in a regulator body, a first chamber communicating with an inlet connectable to a source of gas under pressure, a second chamber separated from the first chamber by a wall traversed by a passage enclosed by piston means secured to a hollow rod sliding in sealed fashion in the passage and comprising an end extending into the first chamber and forming a valve member coacting with a valve seat disposed in the first chamber, the piston being urged in a direction opposite to the valve seat by a spring disposed in the second chamber and bearing on the wall, a third chamber separated from the second chamber by piston means and communicating with at least one outlet connectable to a user circuit and with the hollow rod, and a fourth chamber opening outwardly of the body, delimited externally by a flexible wall and communicating with the second chamber, the second and fourth chambers being filled with a substantially incompressible fluid.

BACKGROUND OF THE INVENTION

A fluid reservoir regulator with a membrane of this type is known from U.S. Pat. No. 4,396,032. The arrangement described in this document requires a large volume of incompressible fluid and does not permit easy changing of the valve seat, this changing requiring an emptying and then a refilling with the incompressible fluid.

Regulators have also been proposed using in place and instead of the flexible wall, a porous wall, this latter approach having however the risk of loss of fluid and in particular for divers in cold water, the drawbacks of penetration of the water into the fluid reserve and as a result risk of seizure of the movable members of the regulator and blocking of the porous wall by ice crystals.

SUMMARY OF THE INVENTION

The present invention has for its object to provide improvements to the flexible wall regulators defined above, greatly facilitating their maintenance, permitting producing the regulator in a compact form with a small reserve of incompressible fluid and conferring increased safety and reliability of operation.

To do this, according to one characteristic of the invention, the valve seat is carried by a closure member delimiting externally the first chamber and mounted in an end of the body, and in that the fourth chamber is formed in a lateral region of the body, preferably substantially opposite the inlet of the gas under pressure.

According to other characteristics of the invention:

- the fourth chamber communicates with the second chamber through an opening formed in the wall separating this latter from the first chamber and which is preferably formed of a single piece with the body;
- the hollow rod coacts with a joint maintained in the wall by a ring urged by a spring extending into the first chamber and bearing on the valve seat;
- the piston means comprises a piston and a membrane delimiting internally the third chamber.

BRIEF DESCRIPTION OF THE DRAWING

Other characteristics and advantages of the present invention will become apparent from the following description, given by way of non-limiting example, with respect to the accompanying drawing, in which the single FIGURE is a cross-sectional view of an embodiment of regulator according to the invention.

DETAILED DESCRIPTION OF THE INVENTION

The regulator, also called expander in French-speaking countries, comprises a body 1 of generally cylindrical configuration comprising, from top to bottom in the FIGURE and coaxially with the axis of the body, an upper screw-threaded bore 2 prolonged by a bore 3 of reduced diameter, itself prolonged by a central bore 4 of small diameter opening into a stepped lower bore 5 of greater diameter. The bores 3 and 5 form, as will be seen above, a first chamber and a second chamber, separated from each other by a body portion forming an internal wall or a partition 6 traversed by the small bore 4. Into the bore 3 there opens transversely a stepped bore 7 adapted to receive a coupling 8 for connection to a source of gas under pressure, typically air or a mixture of respiratory gases under pressure. Opposite the transverse bore 7 is a blind bore 9 forming in the body a chamber offset axially from the chamber 5 and opening normally outwardly but closed by a profiled membrane 10 mounted on the body 1 by a screw-threaded ring 11. According to one aspect of the invention, the chamber constituted by the bore 9 communicates continuously with the chamber formed by the bore 5 through an opening 12 formed in the partition 6.

In the bore 5 is mounted a piston means comprising a piston 13 sliding, in sealed relation thanks to an O-ring 14, in the lower flared end of the bore 5 and, to eliminate any risk of loss at the joint 14, secured to an annular flexible membrane 15 whose periphery is clamped between the lower end of the body 1 and an annular block 16 on the lower end of body 1 and defining an internal chamber 17 communicating through at least one passage 18 with at least one outlet passage 19 formed in an annular member 20 on the lower cylindrical end of reduced diameter of the block 16, for the connection of a medium pressure user circuit, typically a second expansion stage of equipment for a diver. With the arrangement according to the invention, the chambers 9 and 5 are filled once for all time in the factory, without risk of contamination of the filling fluid by external components. The piston 13 comprises a hollow rod 21 sliding in the central bore 4 and extending within the bore 3. The seal between the rod 21 and the central partition 6 is ensured by a joint 22 disposed in an annular throat of the partition 6 connecting the bores 4 and 3 and maintained by a ring 23 disposed in the bore 3 about the rod 21.

According to one aspect of the invention, the chamber formed by the bore 3 is closed upwardly by a cylindrical element forming a valve seat 24, of semi-rigid plastic material, received in a lower recess in a closure element 25 mounted in sealed relationship in the screw-threaded end bore 2 of the body 1. In the high pressure chamber formed by the bore 3 is disposed, about the rod 21, a spring 26 bearing on the seat element 24 and on the ring 23 so as to maintain the latter in a position maintaining the joint 22 in its throat. The membrane 15 is secured to the piston 13 by a central hollow screw 27 such that the central channel of the hollow rod 21 is in permanent communication with the lower medium pressure chamber 17 and with the outlet 19. The free end of the rod 21 is beveled to constitute a valve element coacting selectively with the valve seat 24 and thus ensuring, with the piston 13, a pressure reduction function, the reduced pressure being determined by a calibrated spring 28 bearing on the partition 6 and urging the piston 13 in the direction opposite that of the stationary valve element 24. To adapt the reduced pressure to the ambient pressure, the upper surface of piston 13 must also be exposed to this ambient pressure. This function is ensured by an incompressible fluid, typically a silicone oil bath 29 filling the chambers constituted by the bores 5 and 9 and transmitting to the piston 13 the ambient pressure via the membrane 10 closing the bore 9.

Although the present invention has been described with respect to a particular embodiment, it is not thereby limited but on the contrary is susceptible to modifications and variations which will be apparent to those skilled in the art.

I claim:

1. A gas pressure regulator comprising, in a body having a main direction with opposite end portions and lateral sides, a first cavity and a second cavity separated by a partition wall having a through passage, a piston means arranged in the second cavity and secured to a hollow rod sealingly slidingly extending in the through passage, whereby a first chamber and a second chamber are delimited in the first and second cavities by the partition wall, respectively, a third chamber being delimited in the second cavity by the piston means and communicating with the first chamber by the hollow rod, said hollow rod having an end portion forming a valve member movable in the first chamber and adapted to cooperate in contact engagement with a valve seat carried by a closure member mounted in the body and closing externally the first chamber, an inlet means connectable to a source of gas under pressure and in fluid flow communication with the first chamber, an outlet means in fluid flow communication with the third chamber, and a fourth chamber formed in a lateral side of the body, opening outwardly and closed outwardly by an impervious flexible wall and in fluid flow communication with the second chamber, the second and fourth chambers filled with a substantially incompressible fluid.

2. The regulator according to claim 1, wherein the fourth chamber is formed substantially opposite the inlet means.

3. The regulator according to claim 2, wherein the fourth chamber communicates with the second chamber via an opening formed in the partition wall, in parallel to the through passage.

4. The regulator according to claim 3, wherein the partition wall is formed of one piece with the body.

5. The regulator according to claim 1, wherein the hollow rod sealingly contacts with a seal maintained in the partition wall by a ring urged by a spring extending into the first chamber and bearing on the valve seat.

6. The regulator according to claim 5, wherein the valve seat is formed by a member of plastic material received in a central recess of the closure member.

7. The regulator according to claim 1, wherein the piston means comprises a movable assembly of a piston sliding in the second chamber and an annular membrane delimiting internally the third chamber.

8. The regulator according to claim 1, wherein the fluid is a silicone oil.

9. The regulator according to claim 1, wherein the gas under pressure is a respiratory gas for divers.

* * * * *